United States Patent
Yu

(10) Patent No.: US 7,885,156 B2
(45) Date of Patent: Feb. 8, 2011

(54) METHOD FOR CONTROLLING RECORDING POWER OF OPTICAL DISC APPARATUS

(75) Inventor: Jin Woo Yu, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 755 days.

(21) Appl. No.: 11/476,832

(22) Filed: Jun. 29, 2006

(65) Prior Publication Data
US 2007/0053264 A1 Mar. 8, 2007

(30) Foreign Application Priority Data
Sep. 7, 2005 (KR) .................. 10-2005-0083279

(51) Int. Cl.
*G11B 7/125* (2006.01)
(52) U.S. Cl. .................. 369/47.53; 369/53.27
(58) Field of Classification Search ..... G11B 7/00, 7/12
See application file for complete search history.

(56) References Cited

U.S. PATENT DOCUMENTS

| | | | | |
|---|---|---|---|---|
| 5,706,271 A * | 1/1998 | Hashimoto | ................ | 369/53.37 |
| 5,903,531 A * | 5/1999 | Satoh et al. | ................ | 369/44.29 |
| 6,339,578 B1 | 1/2002 | Sasaki et al. | | |
| 2001/0007546 A1* | 7/2001 | Lee et al. | ................ | 369/47.53 |
| 2003/0156513 A1* | 8/2003 | Tseng et al. | ............ | 369/47.53 |
| 2004/0179447 A1* | 9/2004 | Hsu et al. | ................ | 369/47.53 |

FOREIGN PATENT DOCUMENTS

JP 11-250481 9/1999

OTHER PUBLICATIONS

Office Action issued in corresponding Chinese Patent Application No. 200610095848.2 dated Nov. 23, 2007.
Office Action issued in corresponding European Patent Application No. 06012637.2 dated Dec. 13, 2007.
Chinese Office Action issued Nov. 27, 2009 in CN Application No. 200610095848.2

* cited by examiner

*Primary Examiner*—Wayne R Young
*Assistant Examiner*—Nathan A Danielsen
(74) *Attorney, Agent, or Firm*—Stanzione & Kim, LLP

(57) ABSTRACT

A method for controlling the recording power of an optical disc apparatus. The method can search for an optimum recording power using a starting power stored in a recordable high density optical disc based on a manufacturer thereof, and perform recording operations with the optimum recording power while the start power is properly varied through an Optimum Power Control (OPC) procedure. The method comprises the operations of: obtaining an initial start power for performing the OPC procedure of a recordable optical disc; performing the OPC procedure, and judging whether the initial start power is within a range of allowable levels for determining the optimum recording power of the optical disc; re-performing the OPC procedure by varying the initial start power when the initial start power deviates from the range of allowable levels; and storing the new start power when within the range of allowable levels for improved subsequent OPC procedures.

20 Claims, 5 Drawing Sheets

METHOD FOR CONTROLLING RECORDING POWER OF OPTICAL DISC APPARATUS

CROSS-REFERENCE TO RELATED APPLICATION

This application claims the benefit of Korean Patent Application No. 2005-83279, filed on Sep. 7, 2005, in the Korean Intellectual Property Office, the entire content of which is incorporated herein by reference.

BACKGROUND OF THE INVENTION

1. Field of the Invention

Aspects of the present invention relate to a method of searching for an optimum recording power of a recordable optical disc, and, more particularly, to a method of controlling a recording power of an optical disc apparatus, which is capable of reducing an optimum power control (OPC) performance time to search for an optimum recording power using a start power which is stored in a memory based on the optical disc manufacturer.

2. Description of the Related Art

With the development of technology for processing video and audio data, recording media for storing high definition video data and high quality audio data for a long time, for example, optical discs such as a series of DVDs including DVD-R/RW and DVD-RAM, are being researched and are available in the market. Also, as the need for storage capacity is reaching the limit of current media such as DVDs, new research is being focused on high density optical discs, for example, a Blu-ray disc recordable/rewritable (BD-R/RW) which is capable of recording data of a few Gigabytes.

In order to record data on such a high density optical disc, proper recording power should be defined. Recording quality and reproduction quality depend on the recording power, such that recording power can be defined as a standard. In order for the recording power to be at an optimum value, a relation between optical disc types and performance of optical disc apparatuses must be considered. However, since these relations cannot be uniformly determined, the optical disc apparatus must search for the optimum recording power and then record data to a corresponding optical disc in accordance with the determined optimum recording power, i.e., the best recording laser power setting for each optical disc and an optical disc apparatus combination. Therefore, the methods of searching for optimum recording power are standardized, and the standardized method is known as an optimum power control (OPC) process.

In order to perform OPC, a test zone is typically provided in a lead-in zone of an optical disc, such a test zone is used for determining an optimum recording power for recording data on the associated optical disc. When an optical disc apparatus performs an OPC in the test zone of an optical disc mounted therein and searches for the optimum recording power, the subsequent recording operation is performed using the determined optimum recording power.

However, since the recording power is dependent upon the state or type of an optical disc mounted on such an optical disc apparatus and the state of the optical disc apparatus (laser state, recording method, laser type, temperature characteristics, etc.), recording speed, and a modulation curve of the initial OPC starting power is different from that of the final power, a deviation of the optimum recording power, which is found through the OPC search operation, is significant. Also, when the recording operation is performed with the power determined after performing OPC, jitter characteristics deteriorate such that reproduction quality is decreased.

Also, since OPC determines the optimum recording power in an initial area which is characterized by the initial starting power rather than a saturation power, considering the characteristics of the modulation curve, it is important to set the initial starting power based on the current optical disc apparatus and the optical disc state in order to perform a stable OPC. However, the conventional method performs the OPC procedure to search for the optimum recording power without consideration of the above-mentioned factors and the OPC performing time requires at least 4 seconds, which affects lead-in time. Therefore, the performance of the total system is diminished.

SUMMARY OF THE INVENTION

Several aspects and example embodiments of the present invention provide a method of controlling a recording power of an optical disc apparatus, which is capable of searching for an optimum recording power using a start power stored on a recordable high density optical disc based on a manufacturer of the optic disc, and performing a recording operation with the optimum recording power while the start power is appropriately varied through an optimum power control (OPC) procedure.

Another aspect of the present invention provides a method of controlling the recording power of the optical disc apparatus, which is capable of storing the OPC procedure start power for searching for the optimum recording power and reducing a deviation of the OPC recording power which is searched in an identical optical disc apparatus and an identical optical disc, that is, the same manufacturer, make, model, technology, etc.

Another aspect of the present invention provides a method of controlling the recording power of the optical disc apparatus, which is capable of searching for the optimum recording power to confirm whether the current start power is at an allowable level through the OPC procedure which is performed with respect to a previously stored start power, and storing the start power of the confirmed searched allowable level thereto such that current and subsequent OPC performance times can be reduced.

In accordance with an example embodiment of the present invention, a method of controlling the recording power of an optical disc apparatus comprises: obtaining the initial start power for performing the OPC procedure of the recordable optical disc; performing the OPC procedure with respect to the obtained initial start power, and determining whether the initial start power is within a range of allowable levels for the optimum recording power of the optical disc; and re-performing the OPC procedure by varying the initial start power when the initial start power deviates from the range of the allowable levels to obtain a varied start power.

According to an aspect of the present invention, the operation of obtaining the initial start power to perform the OPC procedure of the optical disc includes retrieving the initial start power from non-volatile memory which stores the start power of optical discs based on manufacturers of the optical discs.

According to an aspect of the present invention, the operation of determining as to whether the initial start power is within the range of allowable levels serves to determine as to whether the initial start power corresponds to an allowable level of a radio frequency (RF) pattern signal which is obtained through the OPC procedure. Here, the range of allowable levels is previously determined by a controller.

According to an aspect of the present invention, the method may further comprise resetting the start power to the varied start power for a later OPC procedure when the varied start power is within the range of allowable levels, based on re-performance of the OPC procedure with the varied start power.

According to an aspect of the present invention, the method may further comprise: the OPC procedure determining optimum recording power through a modulation/Kappa curve when the initial or the varied start power is within the range of allowable levels.

According to an aspect of the present invention, the optical disc comprises a recordable Blue-ray disc or a recordable DVD.

In accordance with a another example embodiment of the present invention, there is provided a method of controlling the recording power of an optical disc apparatus which performs the OPC procedure for determining the optimum recording power for the recordable optical disc, in which the method searches for the optimum recording power using a start power stored in a memory on the basis of manufacturers of the optical discs. Here, the OPC procedure determines optimum recording power by variation of the start power through the OPC procedure.

In accordance with another example embodiment of the present invention, there is provided a method of controlling a recording power of an optical disc apparatus which performs the OPC procedure for determining the optimum recording power for the recordable optical disc, comprising: obtaining the start power stored on the basis of a manufacturer of the recordable optical disc from a memory; determining as to whether this start power is within the range of allowable levels which was previously determined in a controller through the OPC procedure, wherein the optimum recording power is determined using the obtained start power; and re-performing the OPC procedure as the start power retrieved from the memory is varied to a start power of an allowable level when the retrieved start power is outside the range of allowable levels.

According to an aspect of the present invention, the method may further comprise: resetting the start power in memory to the allowable level of the start power which was found during the previous retrieval and variable search operations for a later OPC procedure.

According to an aspect of the present invention, the method may further comprise the operation of performing the OPC procedure to determine the optimum recording power through the modulation/Kappa curve procedure when the varied start power is within the range of allowable levels, based on re-performance of the OPC procedure using the start power of the varied allowable level.

In addition to the example embodiments and aspects as described above, further aspects and embodiments of the present invention will be apparent by reference to the drawings and by study of the following descriptions.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EXAMPLE EMBODIMENTS

Figure 1:
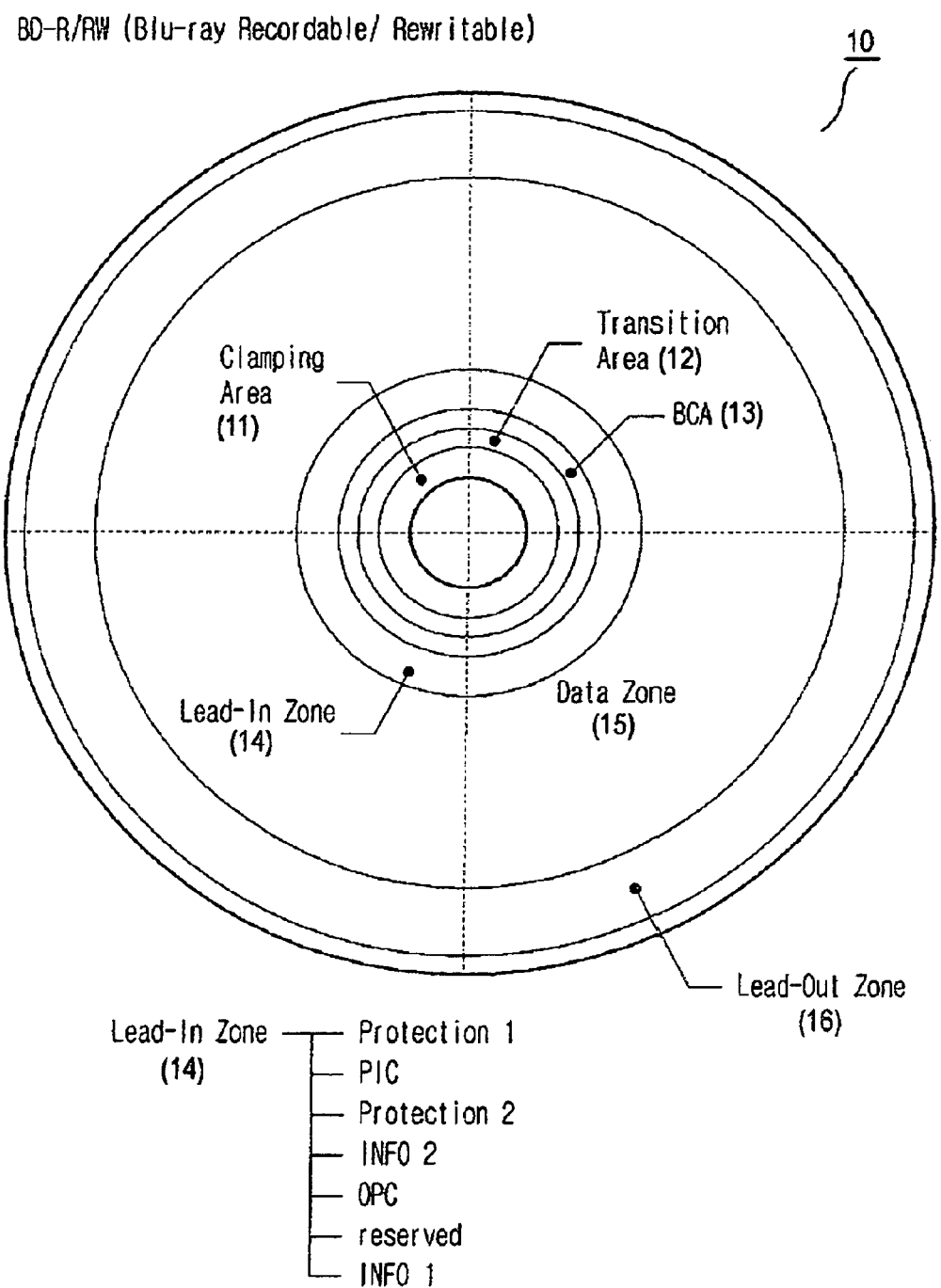
FIG. 1 is a view illustrating a track structure of a high density optical disc such as a Blu-ray disc recordable/rewriteable (BD-R/RW) according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a view illustrating a track structure of a high density optical disc 10, such as a Blu-ray recordable disc (BD-R/RW) according to an embodiment of the present invention.

As shown in FIG. 1, the high density optical disc 10 is configured such that, a clamping area 11, a transition area 12, a burst cutting area (BCA) 13, and a lead-in zone 14 are formed sequentially from an inner peripheral of the optical disc 10 outward, and a data zone 15 is formed in an intermediate area of the optical disc 10, and the lead-out zone 16 is formed on an outer periphery of the optical disc 10.

The lead-in zone 14 is partitioned into a first protection area (Protection 1), a Permanent Information amp Control data (PIC) area, a second protection area (Protection 2), an information area INFO 2, an OPC area, a reserved area, and an information area INFO 1. The first protection area (Protection 1) and the PIC area are pre-recorded areas in which data is previously recorded, whereas, the rest of the areas, including the lead-in area, the data area, and the lead-out area are recordable areas in which new data can be recorded.

When the optical disc 10 is mounted on the optical disc apparatus, the BCA 13 located in the inner most position of the optical disc 10 is the first accessed. The BCA 13 records primary information of the optical disc 10, such as a disc serial number or an information code for protecting disc copy operations, or copy protection information (CPI).

The PIC area included in the lead-in zone 14, records primary information of the optical disc, which is permanently recorded therein, in high frequency modulated (HFM) grooves formed therein.

Figure 2:
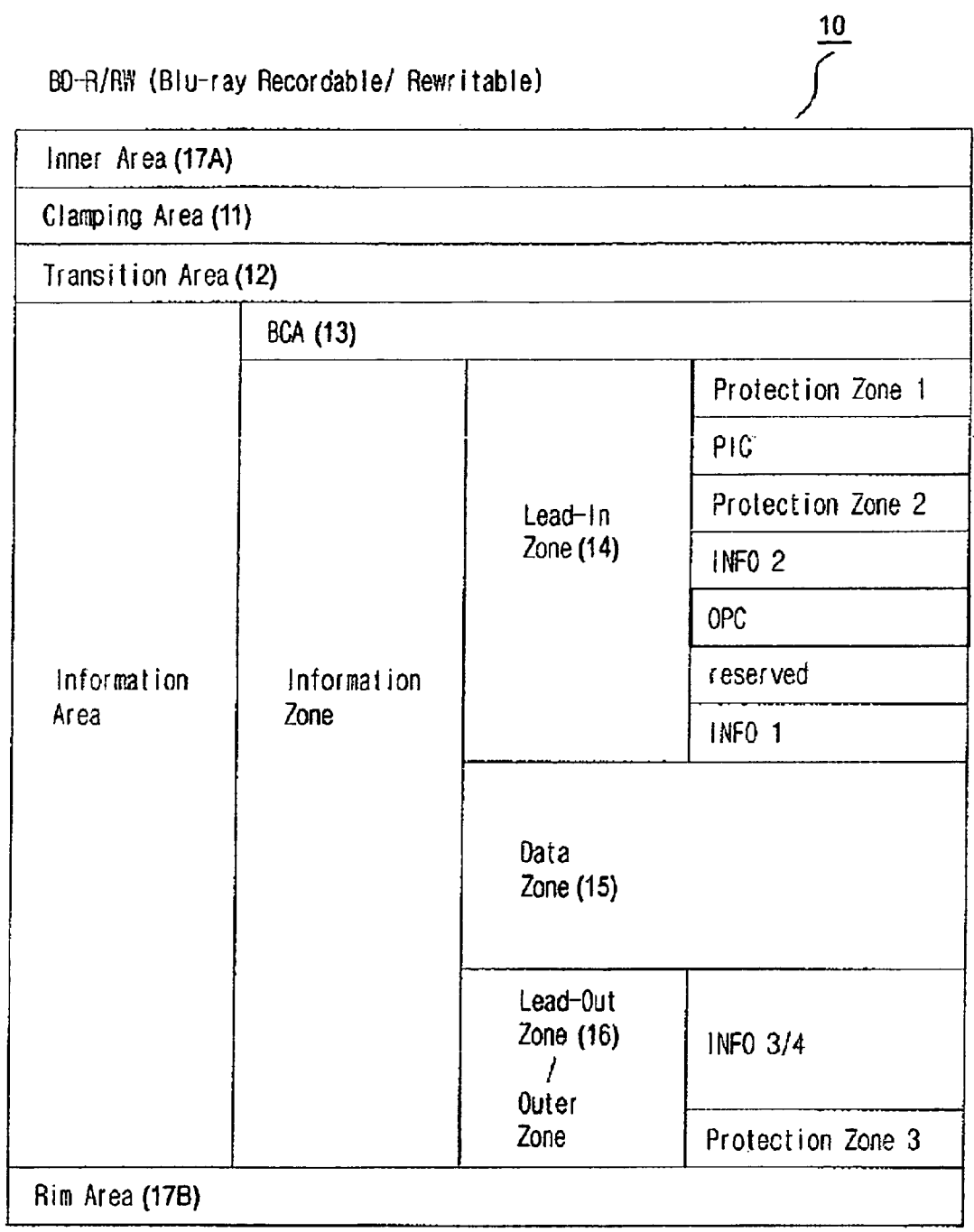
FIG. 2 is a view illustrating an optical disc structure of a high density optical disc (BD-R/RW) according to an embodiment of the present invention.

Turning now to FIG. 2, is a view illustrating a disc structure of a high density optical disc, such as a BD-R/RW according to an embodiment of the present invention is shown.

As shown in FIG. 2, when the recordable high density optical disc 10 records data, the OPC procedure is performed in order to determine an optimum recording power for the optical disc 10 in order to properly perform a recording operation. For this purpose, an OPC area is provided in the lead-in zone 14 on the optical disc 10 to determine laser power to properly record data therein. The OPC area to perform the OPC procedure is allocated by 0x1bc00 to 0x1dc00 based on PAA units. As a result, about 30 seconds are typically needed to completely erase the OPC area.

Figure 3:
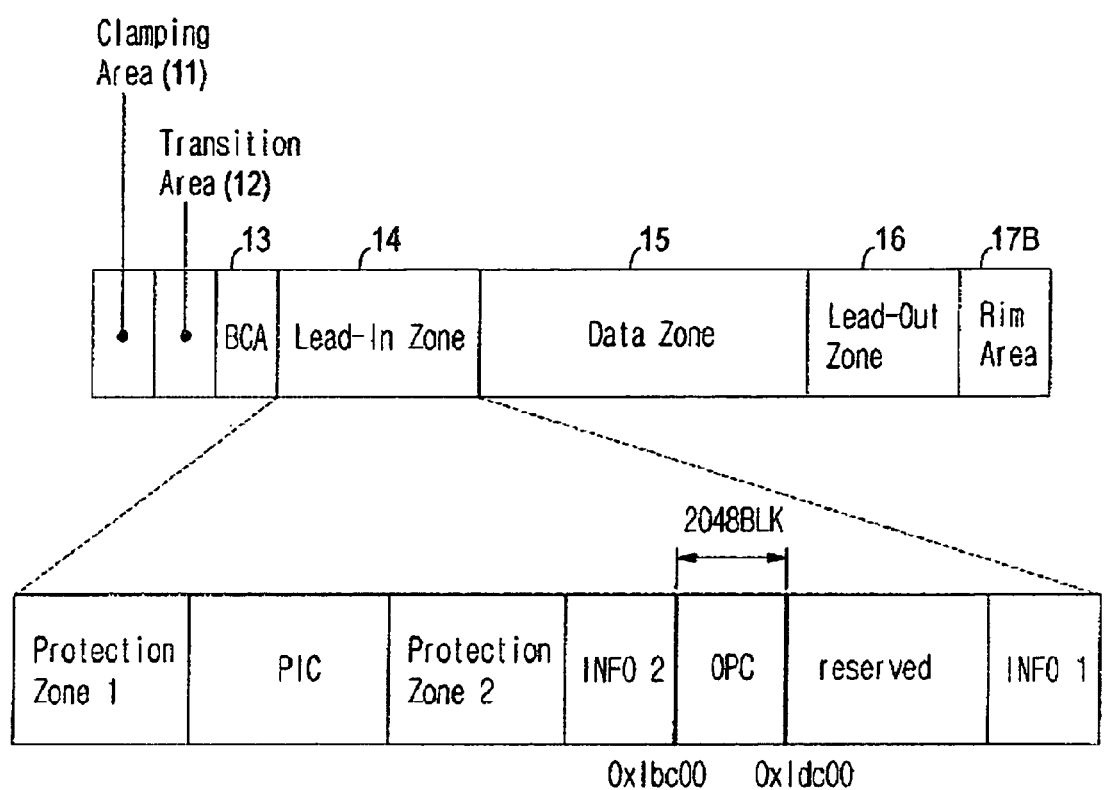
FIG. 3 is a view illustrating a lead-in zone structure of a high density optical disc (BD-R/RW) according to an embodiment of the present invention.

FIG. 3 illustrates an example of a lead-in zone 14 structure of a high density optical disc according to an embodiment of the present invention. The OPC area (Power Calibration Area (PCA) in the case of a DVD) in the lead-in zone 14 has a test area for performing an OPC test. The test area has a size for recording test data in intervals of 0x1bc00 to ~0x1dc00 based on PAA units, or about a 2048BLK, which is allocated to the OPC area (PCA area in the case of a DVD) to perform the OPC procedure.

In order to start the OPC test in such an OPC area, a recordable blank area in the OPC area is checked when setting a target address for the final OPC, and then the OPC test is performed.

Figure 4:
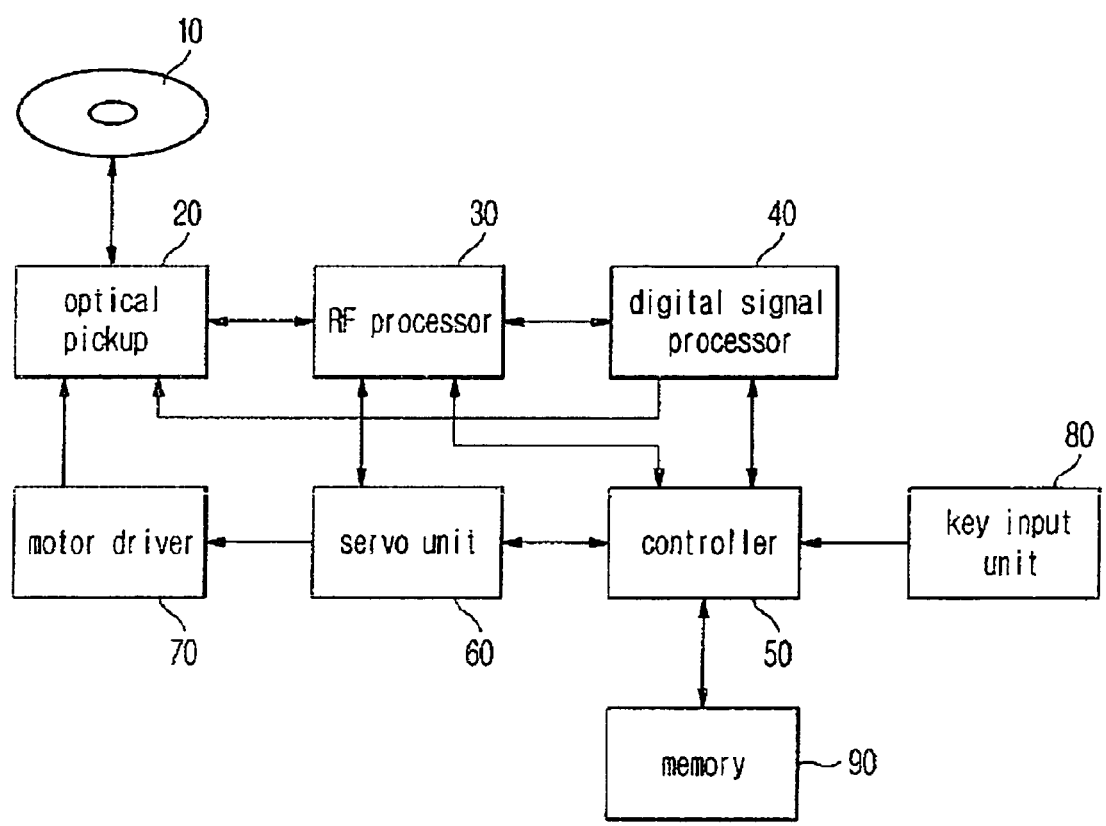
FIG. 4 is a block diagram of an optical disc apparatus of a high density optical disc according to an embodiment of the present invention.

FIG. 4 is a block diagram of an example optical disc apparatus according to an embodiment of the present invention. As shown in FIG. 4, the optical disc apparatus includes a high density optical disc 10, an optical pickup 20, an RF processor 30, a digital signal processor 40, a controller 50, a servo unit 60, a motor driver 70, a key input unit 80 and a memory 90.

For purposes of brevity, the optical disc apparatus, albeit in whole or in part, can also be referred to as a drive system which can be internal (housed within a host) or external (housed in a separate box that connects to a host). The optical disc can be any high-density medium, such as Blu-ray disc (BD) and other advanced optical disc (AOD); however, other optical discs can also be utilized, including DVD, DVD-R, DVD-RW, DVD+RW, DVD-RAM, DVD-ROM, CD, CD-R, CD-RW, and CD-ROM. In addition, such an optical disc apparatus may be a single apparatus, or may be separated into a recording apparatus (i.e., digital video disc recorder "DVDR") and a reading apparatus (i.e., compact disc player "CDP" or digital video disc player "DVDP").

The optical pickup 20 records data to and reads data from the high density optical disc 10 which is recordable and reproducible.

The RF processor 30 rectifies data from the optical pickup 20 and generates an RF signal. The RF processor 30 has an automatic laser power control function for controlling a laser diode such that the laser diode output power is optimized to the high density optical disc 10.

The digital signal processor 40 converts the RF signals from the RF processor 30 into digital signals to perform data demodulation or data modulation for recording data. The controller 50 controls the optical pickup 20, the RF processor 30, the digital signal processor 40, and the servo unit 60, according to a user's input commands. Also, the controller 50 inputs focus servo and tracking servo ON/OFF commands to the servo unit 60. It is understood that a user can input commands by any input device, such as computer mice, remote controller, touch screen displays, keyboards, etc.

Also, the controller 50 searches for an optimum recording power of the optical disc 10 using the initial start power of the high density optical disc 10 based on a manufacturer thereof, which is stored in the memory 90, and performs recording operations at the start power while the recording power is properly varied through the OPC procedure. When the OPC procedure determines the optimum recording power, the optimum power thus determined is compared to an allowable level with respect to the start power which was previously stored in the memory 90. The optimum power thus determined and confirmed to be within the range of allowable levels is stored as a new start power in the memory 90, such that later OPC performance time can be reduced when an identical optical disc (same manufacturer, model, technology, etc.) is used in the identical optical disc apparatus.

The allowable level is a modulation value of RF pattern signals which are obtained through the OPC procedure. Since a range of allowable levels was previously determined by the controller 50, when the current start power stored in the memory 90 is an allowable level, the initial start power is accepted as the optimum recording power. On the other hand, when the current start power stored in the memory 90 is not an allowable level, the OPC start power used to search for the allowable level is reset and then the OPC procedure is performed again to search for the optimum recording power.

The servo unit 60 generates drive signals for focusing, tracking and spindling of the optical pickup 20 based on RF signals which are generated in the RF processor 30 by the controller 50.

The motor driver 70 performs servo control that varies rotation speed of the high density optical disc 10 and data read positions of the optical pickup 20, according to control of the servo unit 60.

The key input unit 80 inputs key signals to the controller 70, in which the key signals serve to direct operations such as to open and close an optical disc tray, apply power ON/OFF for operations of the optical disc apparatus, and record/reproduce/erase data on the high density optical disc 10.

The memory 90 stores information for a write strategy based on a manufacturer of the high density optical disc 10 and the OPC initial start power for determining optimum recording power of the high density optical disc 10. Preferably, the memory 90 is implemented with an electrically erasable read-only memory (EEPROM) or flash memory. Also, the memory 90 stores data for control operations of the controller 50 and parameters for the OPC procedure.

In addition, when a modulation value of RF pattern signals, which is obtained through the OPC procedure while searching for the optimum recording power with respect to the start power previously stored in the memory 90 when performing another OPC procedure, is not within the range of allowable levels which was previously set in the controller 50, then the current start power is varied by a predetermined magnitude to reset the initial start power and the OPC procedure is performed again to search for the optimum recording power, such that the reset initial start power can be stored in the memory 90.

The method of controlling a recording power of the optical disc apparatus is described in connection with FIG. 5 in detail below.

Figure 5:
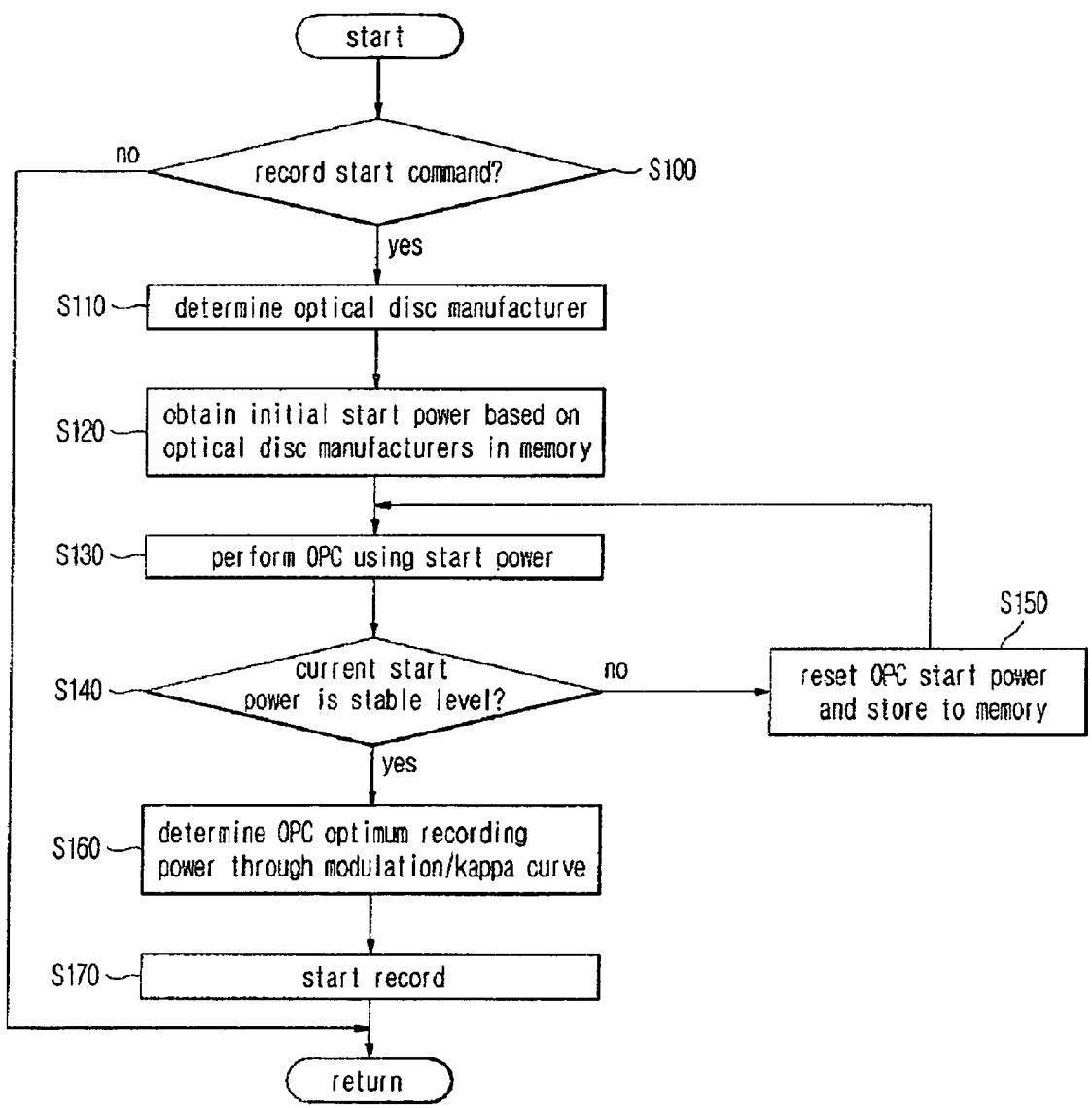
FIG. 5 is a flow chart for describing a method for controlling recording power of an optical disc apparatus according to an embodiment of the present invention.

FIG. 5 is a flow chart for describing a method of controlling the recording power of an optical disc apparatus according to an embodiment of the present invention. The memory 90 stores information for a write strategy based on a manufacturer of the high density optical disc 10 and an initial OPC procedure start power used to determine an optimum recording power of the high density optical disc 10.

As shown in FIGS. 1 to 3, when a record start command is input through the key input unit 80 to record data on the high density optical disc 10 at operation S100, the controller 50 transmits the command to the optical pickup 20 through the digital signal processor 40 and the RF processor 30. The optical pickup 20 reads a table of contents (TOC) information recorded in the lead-in zone 14 of the high density optical disc 10 before the OPC procedure for determining the proper recording power of the optical disc 10 is performed.

The controller 50 detects the start time of the lead-out zone 16 from the TOC information to determine the manufacturer of the optical disc 10. Since the lead-out zone 16, which stores a signal indicative of a program end, has a start time different from those of lead-out zones in other optical discs based on the manufacturer, the controller 50 can easily discriminate the manufacturers of the optical discs 10 at operation S110.

When the manufacturer of the optical disc 10 is determined, the controller 50 performs a search operation to the memory 90 and obtains an initial start power of the optical disc 10 at operation S120. Then the OPC procedure is performed using the initial start power obtained from memory at operation S130.

Since the optimum recording power is determined by the OPC procedure in an initial region of the modulation curve characterized by an initial starting power rather than in a saturation region of the curve characterized by a more stable power, it is important to set the initial starting power based on a current optical disc apparatus and an optical disc state in order to perform a stable OPC procedure. As such, in the OPC procedure for searching for the optimum recording power using the initial start power which is stored in the memory 90 based on a manufacturer of the recordable high density optical disc 10, a confirmation is performed as to whether the current start power is an allowable level according to previously stored values in the controller 50 at operation S140.

Based on such confirmation, when the current start power is not an allowable level, the current start power is changed by a predetermined magnitude to properly vary the OPC start power and then the varied start power is stored in the memory 90 at operation S150. Then, the controller 50 returns to operation S130 to perform the OPC procedure to search for the optimum recording power again, such that operations S130, S140, and S150 are repeatedly performed.

Here, the number of times of repeating the OPC procedure, as the OPC start power is reset, is at the most three times. Such a restriction on the number of times is in consideration not of the OPC start power, but of the performance of the optical pickup 20 and state of the optical disc 10 while the OPC procedure is repeatedly performed, to reduce deviation of the recording power when the recording power is obtained through the OPC procedure.

On the other hand, when the current start power is at an allowable level, the OPC optimum recording power is determined through a record measurement of the modulation/Kappa curve, that is, a power swing, at operation S160. As a result, the optical pickup 20 emits a laser beam of the OPC determined optimum recording power to the high density optical disc 10 to record data therein at operation S170.

Therefore, as the OPC procedure is directly performed with respect to the initial start power of the optical disc 10, which was previously stored in the memory 90, when such an OPC procedure is performed later or another OPC procedure is performed, the lead-in time of the high density optical disc 10 can be reduced.

The method of the present invention is an algorithm to determine the optimum recording power with respect to the OPC procedure initial start power which was previously stored in the memory 90. Namely, the search for the optimum recording power is performed using the start power which was stored on the basis of the manufacturer of the recordable high density optical disc 10, such that the recording quality is improved by employing the optimum recording power determined when the start power is properly varied through the OPC procedure.

According to the method of controlling the recording power of the optical disc apparatus according to the present invention, the optimum recording power is searched for using a start power stored on the basis of the manufacturers of the recordable high density optical discs, such that the recording operation can be performed with the optimum recording power determined when the start power is properly varied through the OPC procedure.

Also, as the OPC start power for searching for the optimum recording power is stored, subsequent OPC procedures to search for the optimum recording power in the same optical disc apparatus and identical optical discs can be reduced.

In addition, as an aspect of when the OPC determines the optimal recording power, the method of the present invention can verify the optimum recording power thus determined based on whether the current start power is at an allowable level with respect to the previously stored start power, and store the verified start power of the allowable level, such that the OPC performance time can be reduced by using the stored start power of the allowable level later, thereby improving the performance of the system.

While the present invention has been particularly shown and described with reference to example embodiments thereof, it will be understood by those skilled in the art that various changes in form and details may be made therein without departing from the spirit and scope of the present invention. For example, other recording media, such as Blu-ray disc, advanced optical disc (AOD); HD-DVD, DVD, DVD-R, DVD-RW, DVD+RW, DVD-RAM, DVD-ROM, CD, CD-R, CD-RW, and CD-ROM, can be utilized, as long as the OPC is implemented in the manner as described in FIG. 1 through FIG. 5. In addition, the test zone (e.g., the OPC area) can be fixed or flexible in designated areas of the optical disc. Similarly, the system controller can be implemented as a chipset or a general purpose CPU programmed to implement the methods described with reference to FIG. 5. Further, while not required in all aspects, portions of the method can be implemented using computer software and/or firmware encoded on one or more computer readable media to be implemented on one or more computers. Accordingly, it is intended, therefore, that the present invention not be limited to the various example embodiments disclosed, but that the present invention includes embodiments falling within the scope of the appended claims.

What is claimed is:

1. A method of controlling a recording power of an optical disc apparatus comprising:
    obtaining an initial start power for performing an optimum power control (OPC) procedure of an optical disc;
    performing the OPC procedure and determining whether the initial start power is within a range of allowable levels for determining an optimum recording power of the optical disc; and
    re-performing the OPC procedure by varying the initial start power when the initial start power deviates from the range of allowable levels,
    wherein the range of allowable levels is previously determined and serves to determine whether the initial start power corresponds to an allowable level of an RF pattern signal which is obtained through the OPC procedure.

2. The method as claimed in claim 1, wherein the initial start power is recorded in a non-volatile memory based on an optical disc manufacturer.

3. The method as claimed in claim 1, further comprising:
    resetting the initial start power to the varied start/power for a later OPC procedure when the varied start power is within the range of allowable levels.

4. The method as claimed in claim 3, further comprising:
    determining through the OPC procedure the optimum recording power through a modulation curve when the initial or the varied start power is within the range of allowable levels.

5. The method as claimed in claim 1, wherein the optical disc comprises a Blu-ray recordable disc.

6. The method as claimed in claim 1, wherein the optical disc comprises a recordable DVD.

7. A method of controlling a recording power of an optical disc apparatus which performs an OPC procedure for determining an optimum recording power for a recordable optical disc, searching for the optimum recording power using a start power stored in a memory on the basis of a manufacturer of the recordable optical disc, the method comprising:
- determining whether the start power is within a range of allowable levels using RF pattern signals which are obtained through the OPC procedure; and
- varying the start power through the OPC procedure so as to determine an optimum recording power.

8. A method of controlling a recording power of an optical disc apparatus which performs an OPC procedure for determining an optimum recording power for an optical disc, comprising:
- obtaining a start power stored on the basis of a manufacturer of the optical disc from a memory;
- determining whether the start power is within a range of allowable levels using RF pattern signals which are obtained through the OPC procedure, in which the optimum recording power is searched for using the obtained start power; and
- re-performing the OPC procedure as the obtained start power is varied to an allowable level when the obtained start power is outside the range of allowable levels.

9. The method as claimed in claim 8, further comprising: resetting the start power in the memory to the start power varied to an allowable level for later use in the OPC procedure.

10. The method as claimed in claim 8, further comprising:
determining the optimum recording power through the OPC procedure through a modulation curve when the varied start power is within the range of allowable levels, based on re-performance of the OPC procedure using the start power varied to an allowable level.

11. A method of controlling a recording power of an optical disc apparatus comprising:
- retrieving a start power for an optical disc based on the optical disc manufacturer; determining whether the start power is within a range of allowable power levels using RF pattern signals which are obtained through an optimum performance control (OPC) procedure;
- varying the start power when outside the range of allowable levels; and
- determining whether the varied start power is within the range of allowable power levels through the OPC procedure.

12. The method as claimed in claim 1, wherein the start power is retrieved from a memory.

13. The method as claimed in claim 11, wherein performing the OPC procedure further comprises:
determining the optimum recording power through a modulation curve.

14. The method as claimed in claim 11, further comprising storing the varied start power in a memory based on a manufacturer of the optical disc.

15. An optical disc apparatus to determine an optimum recording power of a high density optical disc, comprising:
- an optical pickup to record data on the optical disc and reproduce data from the optical disc;
- a memory to store an initial start power of the high density optical disc based on a manufacturer of the optical disc; and
- a controller to search for an optimum recording power of the optical disc using the initial start power, and to perform recording operations at the start power while the recording power is properly varied through the OPC procedure when the initial start power is outside a range of allowable power levels using RF pattern signals with are obtained through the OPC procedure.

16. The optical disc apparatus as claimed in claim 15, further comprising:
- a radio frequency (RF) processor to rectify data from the optical pickup and generate an RF signal;
- a digital signal processor to convert the RF signals into digital signals to perform data demodulation or data modulation for recording data;
- a servo unit to generate drive signals for focusing, tracking and spindling of the optical pickup based on the RF signals;
- a motor driver to perform servo control that varies rotation speed of the high density optical disc and data read positions of the optical pickup, according to control of the servo unit; and
- a key input unit to input key signals to the controller.

17. The optical disc apparatus as claimed in claim 16, wherein the controller controls the optical pickup, the RF processor, the digital signal processor, and the servo unit, according to a user's input commands and, inputs focus servo and tracking servo ON/OFF commands to the servo unit.

18. The optical disc apparatus as claimed in claim 15, wherein the controller compares the optimum recording power determined through the OPC procedure with an allowable level stored in the memory and stores the optimum recording power as a new start power in the memory when the optimum recording level is an allowable level.

19. An apparatus, comprising:
- an optical pickup to irradiate a laser beam onto an optical disc for recording and reproducing data;
- a memory to store a start power based on a manufacturer of the optical disc;
- a controller arranged to control the optical pickup and to access the memory for performing an optimum performance control (OPC) procedure, wherein the controller is configured to
- determine whether the start power is within a range of allowable power levels using RF pattern signals which are obtained through the OPC procedure,
- vary the start power when the start power is outside the range of allowable levels, determine whether the varied start power is within the range of allowable power levels through the OPC procedure, and
- store the varied start power to the memory.

20. The method as claimed in claim 1, wherein the OPC procedure is performed no more than three times.

* * * * *